United States Patent
Yu

(10) Patent No.: US 10,290,048 B2
(45) Date of Patent: May 14, 2019

(54) VIRTUAL REALITY OPERATION PLATFORM STRUCTURE

(71) Applicant: BITSPOWER INTERNATIONAL CO., LTD., Changhua County (TW)

(72) Inventor: Vincent Yu, Changhua County (TW)

(73) Assignee: Bitspower International Co., Ltd., Changhua County (TW)

(*) Notice: Subject to any disclaimer, the term of this patent is extended or adjusted under 35 U.S.C. 154(b) by 410 days.

(21) Appl. No.: 15/158,563

(22) Filed: May 18, 2016

(65) Prior Publication Data

US 2017/0337620 A1 Nov. 23, 2017

(51) Int. Cl.
 G06Q 30/00 (2012.01)
 G06Q 30/06 (2012.01)
 G06T 19/20 (2011.01)
 G06T 1/20 (2006.01)
 G06F 3/0482 (2013.01)

(52) U.S. Cl.
 CPC ....... *G06Q 30/0643* (2013.01); *G06F 3/0482* (2013.01); *G06T 1/20* (2013.01); *G06T 19/20* (2013.01); *G06T 2219/2008* (2013.01)

(58) Field of Classification Search
 CPC .... G06Q 30/06; G06Q 30/0643; G06T 19/20; G06T 1/20; G06F 3/0482
 See application file for complete search history.

(56) References Cited

U.S. PATENT DOCUMENTS

| 5,963,953 | A | * | 10/1999 | Cram | G06F 17/50 |
| 6,035,305 | A | * | 3/2000 | Strevey | G06Q 10/06 |
| 6,167,383 | A | * | 12/2000 | Henson | G06Q 10/087 |
| | | | | | 703/13 |

(Continued)

FOREIGN PATENT DOCUMENTS

| WO | WO 03/021393 A2 * | 3/2003 | G06Q 30/06 |
| WO | WO-03021393 A2 * | 3/2003 | G06Q 30/06 |

OTHER PUBLICATIONS

J.P. Bishop "Visual Configurator System for Configuring and Ordering IBM Products", IBM Technical Disclosure Bulletin, pp. 368-371, vol. 34, No. 12, May 1992. (Year: 1992).*

(Continued)

*Primary Examiner* — Naeem U Haq
(74) *Attorney, Agent, or Firm* — Rosenberg, Klein & Lee

(57) ABSTRACT

A virtual reality operation platform structure comprises a main virtual frame, a virtual reality operation processing module, a menu module, an output checking module, a clearing module, and an accounting module. The menu module is built-in the main virtual frame and includes a housing menu defaulted a plurality of housings, a motherboard menu defaulted a plurality of motherboards, and a heat dissipation assembly menu defaulted a plurality of elements. Each element is virtually electrically coupled to the motherboard with the virtual reality operation processing module. The output checking module is connected to the menu module for checking an output performance of the motherboard and then generating a performance form. The clearing module is connected to the menu module for processing the re-selection of the menu module. The accounting module is connected to the menu module and generates a list.

10 Claims, 7 Drawing Sheets

(56) References Cited

U.S. PATENT DOCUMENTS

| | | | | |
|---|---|---|---|---|
| 6,725,257 | B1* | 4/2004 | Cansler | G06Q 10/087 709/203 |
| 6,813,531 | B2* | 11/2004 | Coale | G06Q 30/06 700/9 |
| 6,985,876 | B1* | 1/2006 | Lee | G06Q 30/06 705/26.5 |
| 2002/0156698 | A1* | 10/2002 | Machau | G06F 17/50 705/26.5 |
| 2018/0136255 | A1* | 5/2018 | Albert | G01R 31/2806 |

OTHER PUBLICATIONS

Ray Hardee "Solving Piping Problems with a PC", Plant Engineering, pp. 62-64, Aug. 17, 1989. (Year: 1989).*

* cited by examiner

VIRTUAL REALITY OPERATION PLATFORM STRUCTURE

BACKGROUND OF THE INVENTION

1. Field of the Invention

The present invention relates to a virtual reality operation platform structure. It may provide the user to assemble and test the fittings on the motherboard in a virtual space and then feedback to a store to know what the user wants to buy. It may save the buying time and reduce the error rate of assembly.

2. Description of Related Art

The recent technologies are advanced and more and more machinery becomes automatic. The manpower is reduced so as to save time, reduce error rate, and maximize the production capacity. The core of the machinery is the motherboard. The motherboard is the brain of the machinery. The motherboard may be mounted various electric elements, such as capacitances, transistors, memory cards, and resistances. The function of each kind of the electric elements is used to drive the machine according to the setting of built-in programs in the host. The motherboard may be DIY by many people, especially the famous computer production. In the market, there are many places and stores where may provide relative people to freely select the components of the computer. The user may select based on the sold components of store and assemble the computer according to the cost and the scale what the user wants.

Although above mentioned method and structure may make the user assemble the motherboard according to the necessary components what the user wants to match the cost, it may not consider the compatibility between the components, if they are rejected while operating, and if they may have the maximum operation performance since there is no real goods for reference and check/test. The user knows the characteristics of the components from network and the descriptions of the stores, but the user may not exactly know what the performance of the assembled motherboard is. Besides, the descriptions from the network and the stores are not exactly and burning the motherboard and low performance are easy to be occurred. Therefore, how to provide the user truly to assemble the motherboard what the user wants and further to know what the performance is are the key issues for people in the technical field.

In view of the foregoing circumstances, the inventor has invested a lot of time to study the relevant knowledge, compare the pros and cons, research and develop related products. After quite many experiments and tests, the "virtual reality operation platform structure" of this invention is eventually launched to improve the foregoing shortcomings, to meet the public use.

SUMMARY OF THE INVENTION

A main object of this invention is providing a virtual reality operation platform structure. It may select the fittings to virtually assemble and check/test performance. After checking and testing, the relative fittings may be buy in real according to the simulated types to extremely reduce the error rate after assembling and prevent from low performance and being incompatible to the fittings. The time for buying and selecting the real fittings in real stores may be saved. The drawbacks in the prior art may be improved.

In order to achieve above mentioned object, a virtual reality operation platform structure, built-in a virtual reality device, the structure comprising: a main virtual frame; a virtual reality operation processing module, built-in the main virtual frame; a menu module, built-in the main virtual frame, the menu module has a housing menu, a motherboard menu, and a heat dissipation assembly menu, the housing menu is defaulted a plurality of housings with various scales, the motherboard menu is defaulted a plurality of motherboards with various brands, the heat dissipation assembly menu is defaulted a plurality of elements, the elements are virtually electrically coupled to the motherboards and assembled to the motherboards and the housings via the virtual reality operation processing module; an output checking module, built-in the main virtual frame and connected with the menu module for checking an output performance of the motherboards while being coupled to the elements and further generating a performance form; a clearing module, built-in the main virtual frame and connected to the menu module for clearing the selections of the housings, the motherboards, and the elements to re-select with the menu module; and an accounting module, built-in the main virtual frame and connected to the menu module, the accounting module is made a list according to the selected housings, the motherboards, and the elements; wherein in the main virtual frame, the arrangement of the virtual reality operation processing module makes a user be capable for virtually operating the assembly and coupling of the housings, the motherboards, and the elements, and further checking their performances so as to buy the real housings, motherboards, and the elements according to the list after making sure the performances are what the user wants; if the performances of the selected housings, motherboards, and the elements are not what the user wants, the clearing module is cleared the selection of the housings, the motherboards, and the elements to re-select so as to save time and prevent from errors.

The virtual reality operation platform structure may further comprise a debug module which is built-in the main virtual frame, the debug module is debugged the assembly, position, and connection of the housings, the motherboards, and the elements whether is correct or not.

In some embodiments, a suggesting form is outputted after the debug module is finished debugging, and the suggested form is listed at least one collocation of the suitable housings, the suitable motherboards, and the suitable elements according to a debug result of the debug module.

The virtual reality operation platform structure may further comprise a customizing module which is built-in the main virtual frame, and the customizing module is capable for modifying a size of each element listed in the heat dissipation module.

The virtual reality operation platform structure may further comprise a setting module which is built-in the virtual frame, a raw material stocking data unit is built-in the setting module, the raw material stocking data unit saves detail data of each housing, each motherboard, and each element, and each menu of the menu module is read the data of each housing, each motherboard, and each element from the raw material stocking data unit to select and view.

In some embodiments, the setting module includes a receiving/transmitting module for wirelessly or wired electrically connected to as mobile device, the mobile device which is computer, cell phone, or tablet may transmits new data of each hosing, each motherboard, and each element to the receiving/transmitting module so as to store in the raw material stocking data unit and outputs the list of the housings, the motherboards, and the elements after assembling and coupling.

In some embodiments, the setting module includes a receiving/transmitting module for wirelessly connecting to a store and transmitting the list, and the store may takes the housings, the motherboards, and the elements according to the list.

The virtual reality operation platform structure may further comprise a linking module which is built-in the main virtual frame, and the linking module may be wirelessly connected to other virtual device to process in the same main virtual frame.

The virtual reality operation platform structure may further comprise a tour module which is built-in the main virtual frame, and the tour module is explained by audio, video, text, and figure.

According to above descriptions, the advantages of the present invention are described as follows. The user may wear the virtual device to enter the main virtual frame. The menu module, the output checking module, the clearing module, and the accounting module are built-in the main virtual frame. The user firstly enters the housing menu of the menu module to select the housings, and then select the models/scales of the motherboards in the motherboard menu and the wanted elements in the heat dissipation assembly menu. After making sure the housings, the motherboards, and the elements, the electrical coupling of the motherboards and the elements may be processed. It may be performed by the virtual reality operation processing module to virtually operate. After the electrical coupling of the motherboards and the elements is finished, the user may use the output checking module to check/test the virtual assembly of the motherboards and the elements. And then the output checking module may generate/output the performance form to provide for the user to know. If the data in the performance form is what the user wants, the motherboard may be installed into the housing. Finally, the user may enter the accounting module to show/display the selection of the housings, the motherboards, and the elements in the list. If the data in the performance form is not what the user wants, the user may enter the clearing module to clear the selected housings, the selected motherboards, and the selected elements and then re-select other types/scales/models of the housings, the motherboards, and the elements. Accordingly, it may prevent from being unable to check/test, reduce the unnecessary consumptions, and prevent from extremely wasting time and money.

The various objects and advantages of the present invention will be more readily understood from the following detailed description when read in conjunction with the appended drawing.

DETAILED DESCRIPTION OF THE INVENTION

Figure 1:
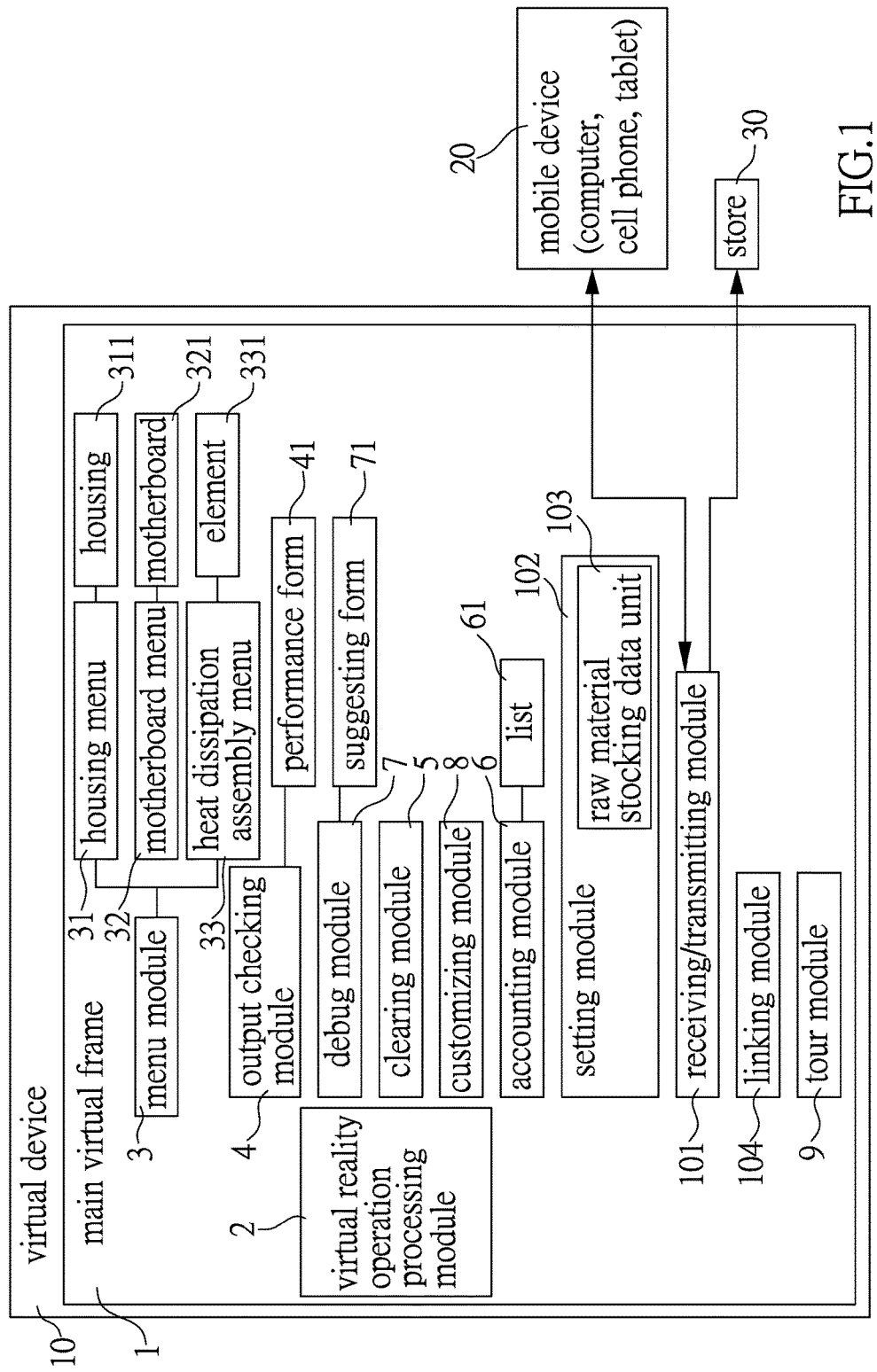
FIG. 1 is a block diagram of a virtual reality operation platform structure of the present invention.
Figure 2:
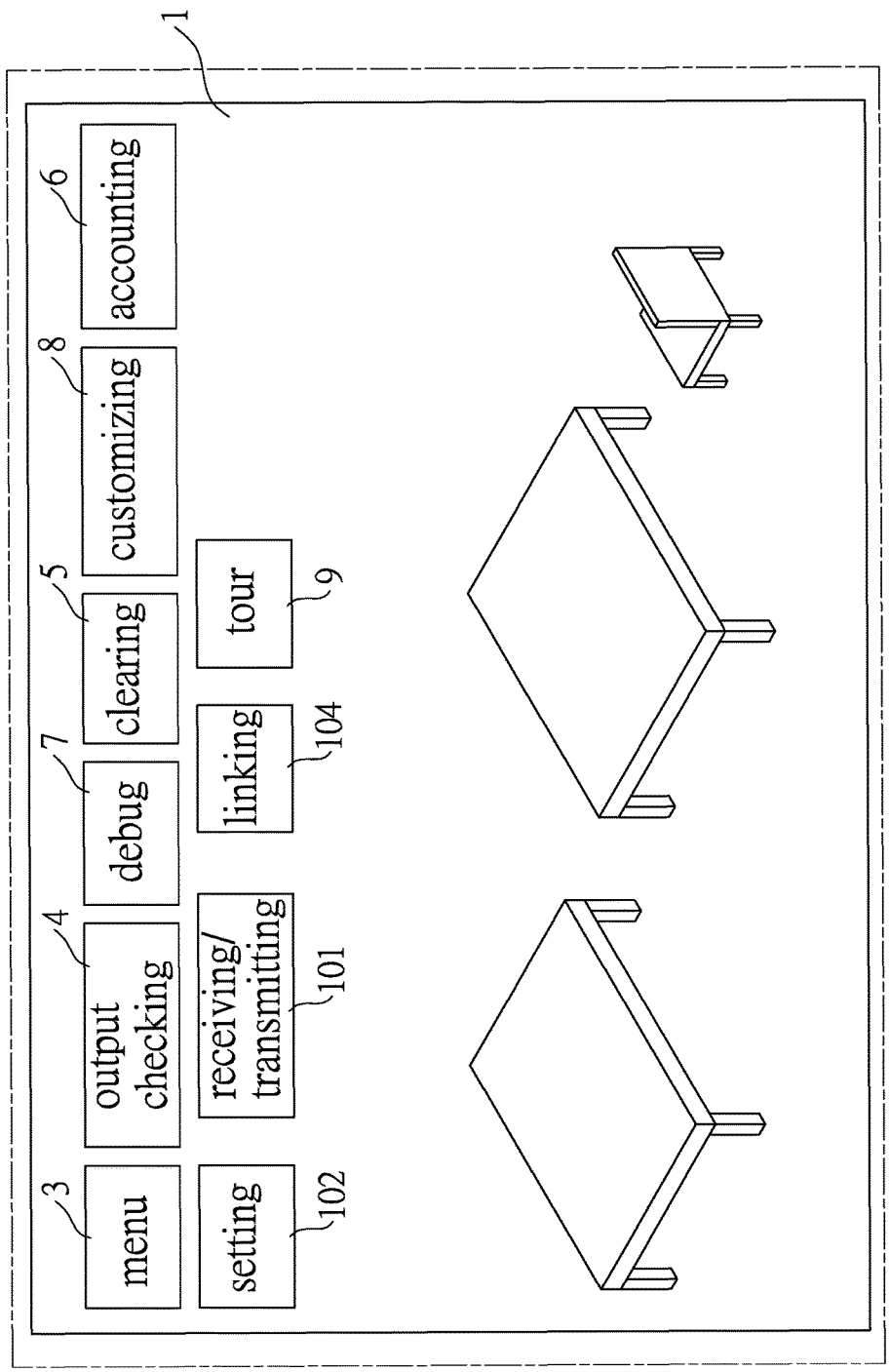
FIG. 2 is a view of a main virtual frame of the virtual reality operation platform structure of the present invention.
Figure 3:
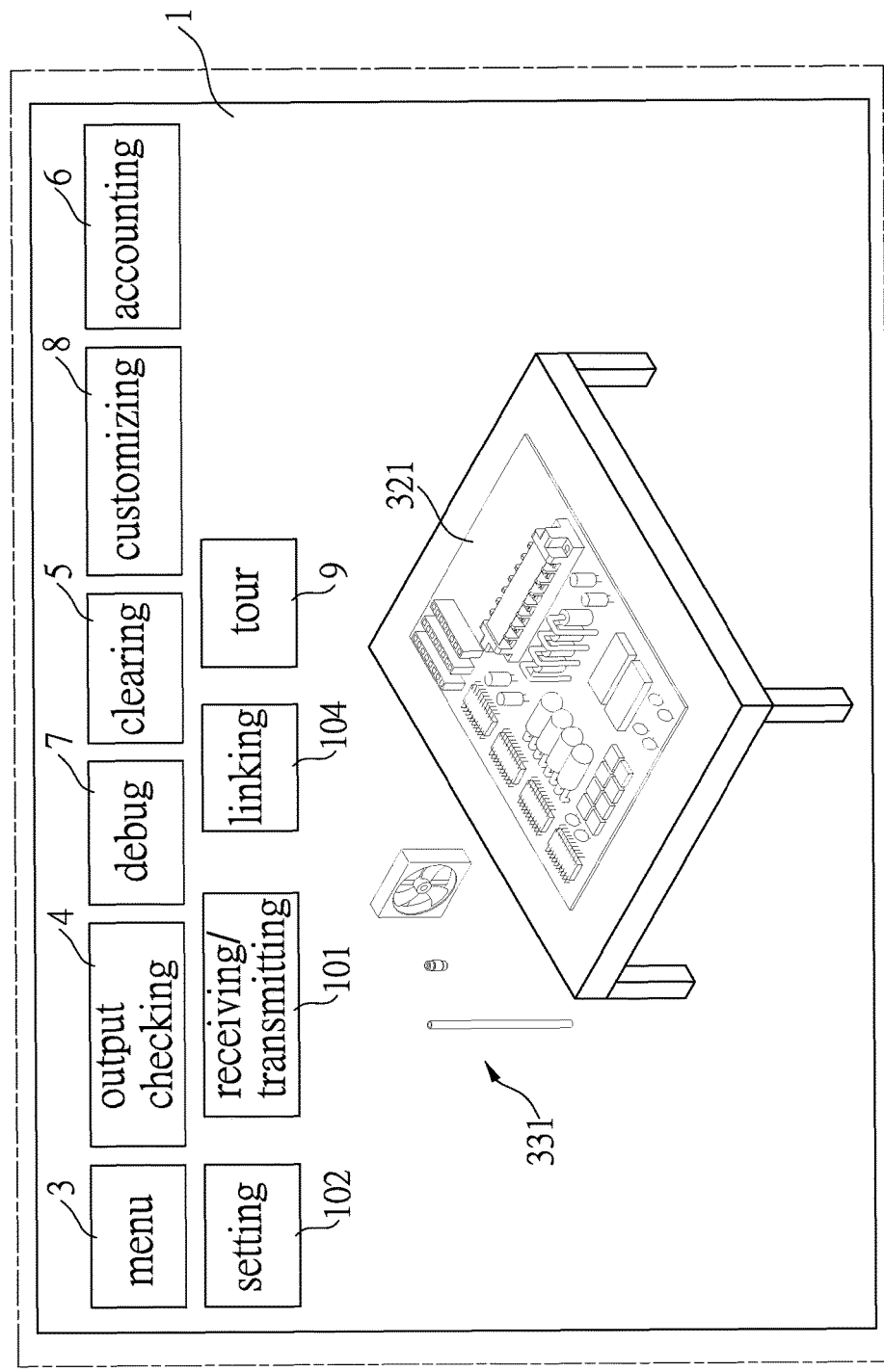
FIG. 3 is a view of the virtual reality operation platform structure of the present invention while a housing and an element are virtually electrically coupled to each other.
Figure 4:
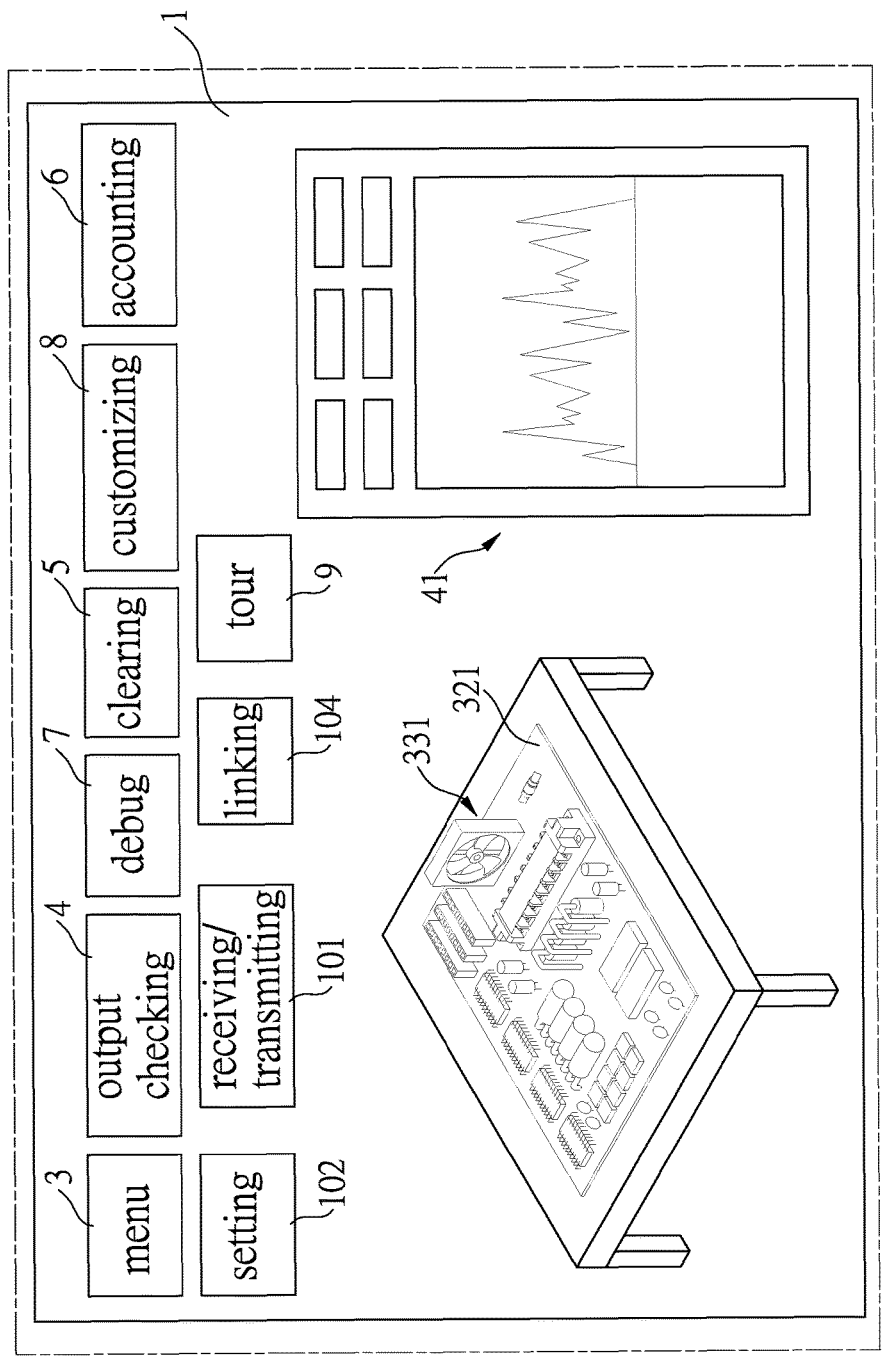
FIG. 4 is a performance form of the virtual reality operation platform structure of the present invention after checking the motherboard.
Figure 5:
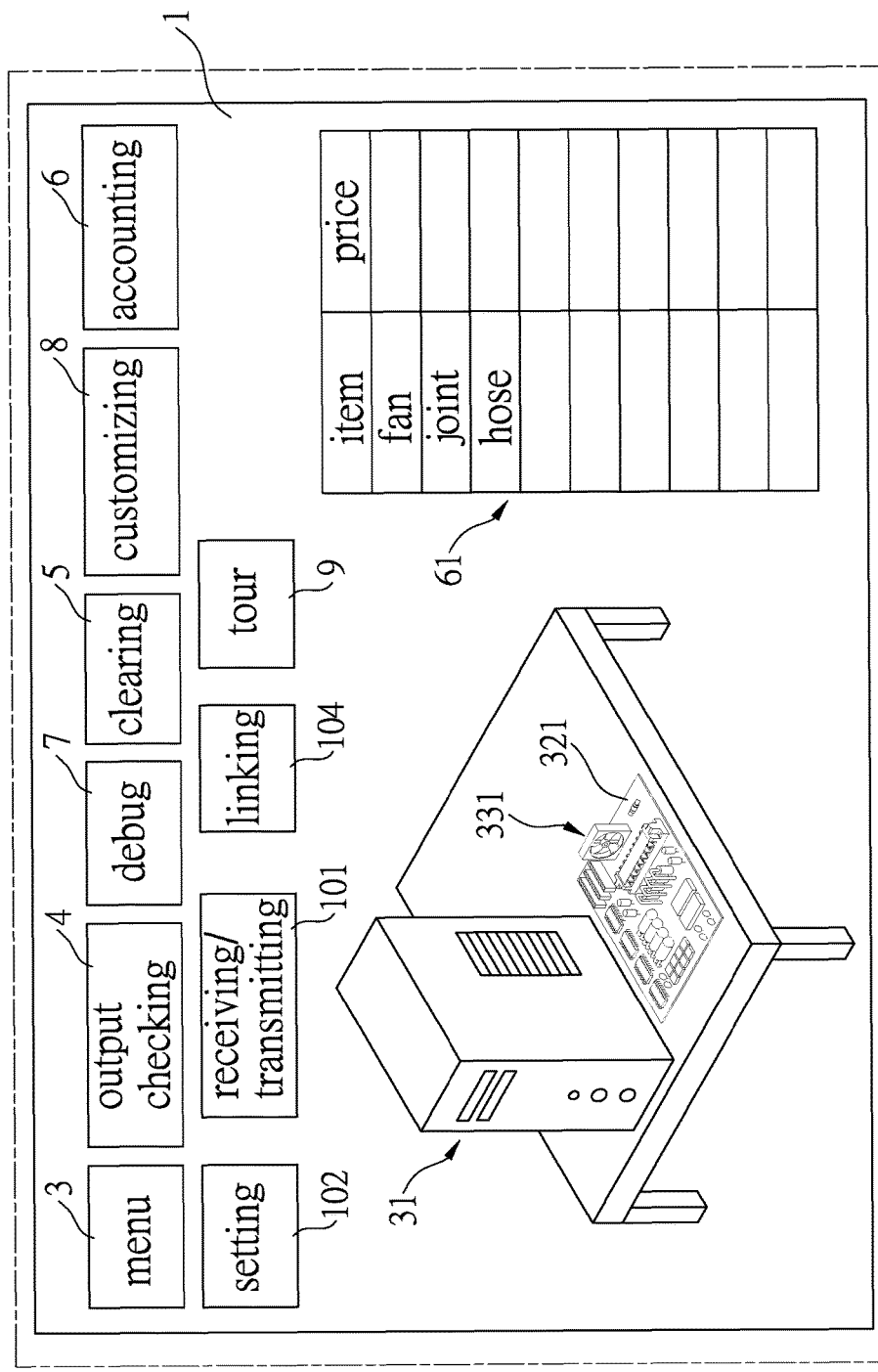
FIG. 5 is a list of the virtual reality operation platform structure of the present invention.

To describe clearly that the present invention achieves the foregoing object and function, the technical features and desired function are described with reference to a preferred embodiment and accompanying drawings.

Please reference to FIGS. 1 to 7, a virtual reality operation platform structure of the present invention is built-in a virtual reality device 10 and may comprise a main virtual frame 1, a virtual reality operation processing module 2, a menu module 3, an output checking module 4, a clearing module 5, and an accounting module 6. The main virtual frame 1 may make a user feel in virtual reality. The virtual reality operation processing module 2 is built-in the main virtual frame 1. The virtual reality operation processing module 2 is a core so that the user may see the main virtual frame 1 and the objects in the main virtual frame 1 in three dimensions and virtually touch the objects just like in reality via the virtual device 10. The menu module 3 is built-in the main virtual frame. The menu module 3 has a housing menu 31, a motherboard menu 32, and a heat dissipation assembly menu 33. The main housing menu 31 is defaulted a plurality of housings 311 with various scales. The motherboard menu 32 is defaulted a plurality of motherboards 321 with various brands. The heat dissipation assembly menu 33 is defaulted a plurality of elements 331. The elements are virtually electrically coupled to the motherboards 321 and assembled to the motherboards 321 and the housings 311 via the virtual reality operation processing module 2. The output checking module 4 is built-in the main virtual frame 1 and connected with the menu module 3 for checking an output performance of the motherboards 321 while being coupled to the elements 331 and further generating a performance form 41. The performance form 41 may be provided the user to know whether the coupling of the selected motherboards 321 and the selected elements 331 is feasible or not and whether it may have the best operation performance or not. The clearing module 5 is built-in the main virtual frame 1 and connected to the menu module 3 for clearing the selections of the housings 311, the motherboards 321, and the elements 331 to re-select with the menu module 3. The accounting module 6 is built-in the main virtual frame 1 and connected to the menu module 3. The accounting module 6 is made a list according to the selected housings 311, the motherboard 321, and the elements 331. In the main virtual frame 1, the arrangement of the virtual reality operation processing module 2 makes a user be capable for virtually operating the assembly and coupling of the housings 311, the motherboards 321, and the elements 331, and further checking their performances so as to buy the real housings, motherboards, and the elements according to the list 61 after making sure the performances are what the user wants; if the performances of the selected housings 311, motherboards 321, and the elements 331 are not what the user wants, the clearing module 5 is cleared the selection of the housings 311, the motherboards 321, and the elements 331 to re-select so as to save time and prevent from errors.

The above mentioned embodiment is the main skill feature of this invention and corresponds to the claim 1 of this invention to understand the object and embodiments of this invention in detail. And the skill features of the depending claims are for describing the claim 1 in detail or adding more skill features, but not limited thereto. It should be known that the claim 1 is not necessary to include the skill features of the depending claims.

Please reference to FIGS. 1 to 5. When the user wants to assemble the computer, in order to prevent from buying wrong elements to result in wasting money, the user may wear the virtual device 10 to do the check and test. When the user is wearing the virtual device 10 and then enters the main virtual frame 1, the main virtual frame 1 lists the menu module 3, the output checking module 4, the clearing module 5, and the accounting module 6, and firstly the user may select the menu module 3 to show relative menus. The menu module 3 has the housing menu 31, the motherboard menu 32, and the heat dissipation assembly menu 33. The user may select the housings 311, the motherboards 321, and the elements 331 according to the menus. After selection, the selected elements 331 may be virtually electrically coupled to the selected motherboard 321 with the virtual reality operation processing module 2. After each element 331 is coupled to the motherboard 321, the output checking module 4 may be selected to check and test. the output checking module 4 may check and test how the performance generated from the motherboard 321 is after the selected elements 331 are coupled to the motherboard 321. And then, the performance form 41 may be provided to the user to know. If the performance is what the user wants, the accounting module 6 may be entered to summarize the selected housings 311, the selected motherboards 321, and the selected elements 331. The accounting module 6 may generate the list 61 to provide the user to know if the check and test is correct. If the performance is not what the user wants, the clearing module 5 may be entered to clear the selected housings 311, the selected motherboards 321, and the selected elements 331 and then the menu module 3 may be re-entered to select until the performance is what the user wants. Due to the electrical coupling, check, and test of the motherboards 321 and the elements 331 through the virtual reality operation, the user may truly experience the performance and reduce the ratio of unmatched scales and bad performance while actually assembling. It is also convenient for the user not to waste time and physical strength to select in a real store.

Please reference FIG. 1. The Virtual Reality is called the VR technology or Artificial Environment. It mainly uses the computer to simulate a three-dimension virtual space to provide the user to see, hear, and touch so that the user is just like staying in a real space/world to observe the objects in the three-dimension space timely and unlimited. When the user is moved, the computer may be processed the complicated calculation and sent back a precise three-dimension image to have presence. The technology is integrated with computer graphics, computer simulation, artificial intelligence, sensing, display, and network parallel processing. It is a hi-tech simulation system aided by the computer technology so as to have high intelligence. Therefore, the main virtual frame 1 further includes a debug module 7. The debug module 7 may be selected to check and test firstly after the electrical coupling of the printed main bard 321 and the elements is finished. The debug module 7 may check and test the size, scale, position, and status of connection of the elements and the status of connection of the motherboard 321 and the housing 311. If the scales of the elements are not conformed to the regulations, the debug module 4 may further generate a suggesting form 71. The suggesting form 71 may list all issues after virtually assembling and provide a most suitable solution for the user to reference so as to make the performance optimize. In addition, besides the debug module 7 is processed the debug to search if the virtual assembly has any problem, the main virtual frame 1 further includes a customizing module 8. When the user is processing the assembly, the sizes of the selected housings 311, the selected motherboards 321, and the selected elements may be modified so that the elements 331 may be matched the scale of the motherboard 321. It may achieve the effect of customizing. The user may provide the scales what he/she wants to the manufacturer to manufacture. The cooperation of the debug module 7 and the customizing module 8 may be provided the virtual operation of the user more smoothly. However, it may not be known if it is correct while operating or how to operate. Therefore, the main virtual frame 1 further includes a tour module 9. The user may enter the tour module 9 to search while the user do not know how to process. The tour module 9 may be explained by audio, video, text, and figure.

Figure 6:
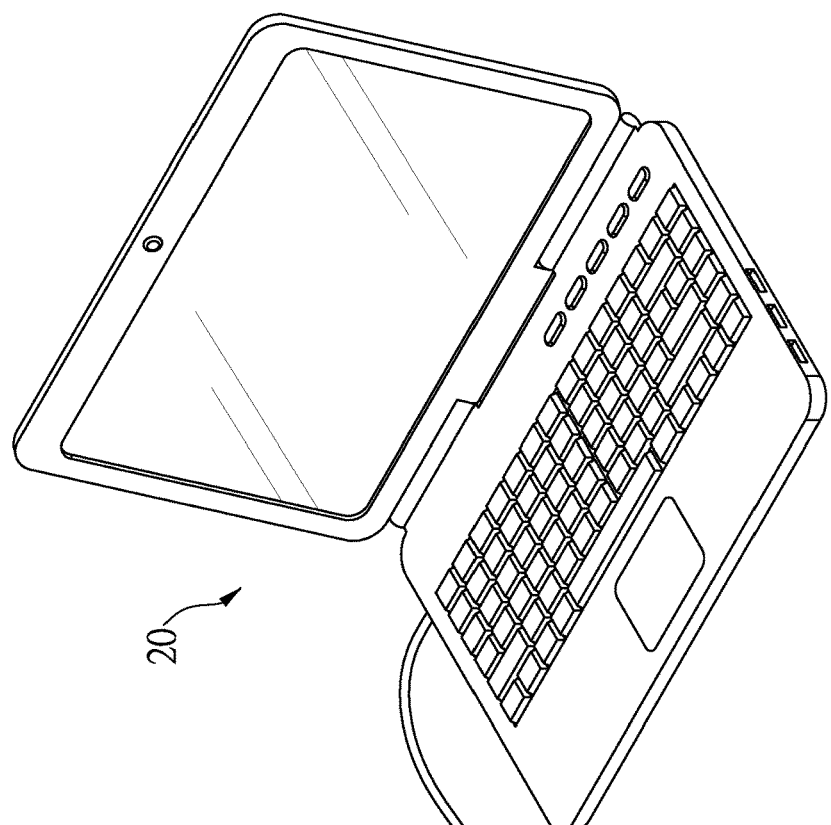
FIG. 6 is a view of the virtual reality operation platform structure of the present invention while transmitting to a computer.
Figure 6:
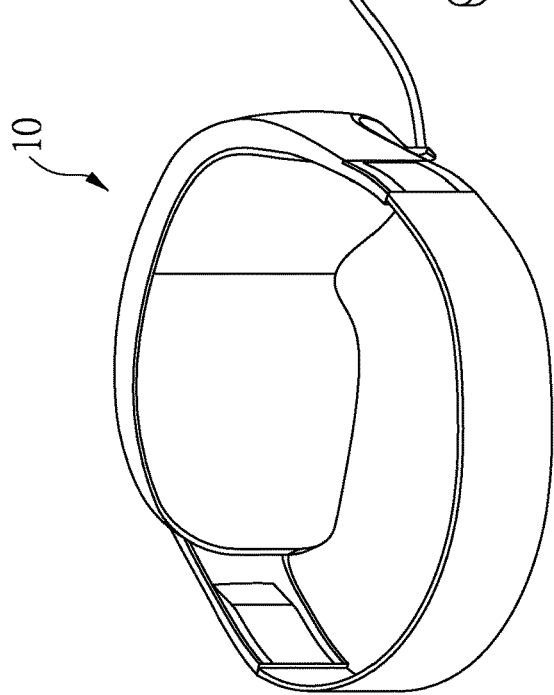
Figure 7:
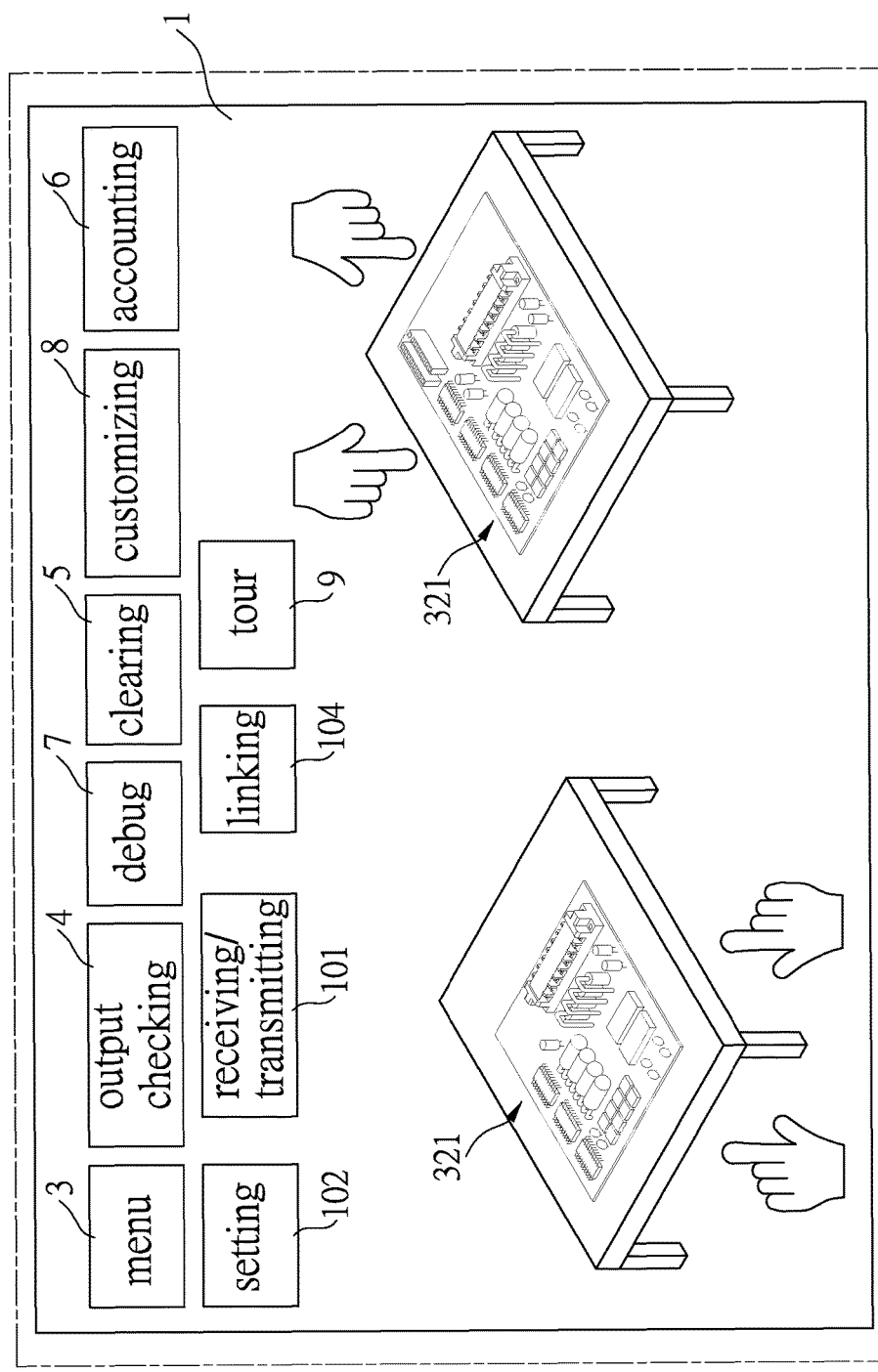
FIG. 7 is a view of the virtual reality operation platform structure of the present invention which is virtually operated in the main virtual by several groups of users.

Please reference to FIG. 6. When the user has confirmed the final assembly, a receiving/transmitting module 101 built-in the main virtual frame 1 may be entered to operate. The receiving/transmitting module 101 is mainly provided the user to output a simulated finish good. The receiving/transmitting module 101 may be electrically connected to a mobile device 20 wirelessly or wired. The mobile device 20 may be a computer, a cell phone, or a tablet (the recent electronic productions). After the user enters the receiving/transmitting module 101, the mobile device 20 may output the simulated finish good in plane two-dimension or dynamic three-dimension file, and further may be transmitted to someone for reference. Besides, the files stored in the mobile device 20 may be transmitted to the receiving/transmitting module 101 and then transmitted to the main virtual frame 1 by the receiving/transmitting module 101 so as to achieve the effect of diversified operations. Furthermore, please reference to FIG. 1, the receiving/transmitting module 101 may be wirelessly connected to a store 30. That is, the store 30 may receive a message about the assembly. The user may transmit the list 61 to the store 30 through the receiving/transmitting module 101 and then the store 30 may help the user to buy the real corresponding housings 311, motherboards 321, elements 331 according to the list 61 so as to save time.

Please reference to FIGS. 1 and 6. According to above descriptions, the electronic productions are changed very soon. In order to keep with the change, the main virtual frame 1 includes a setting module 102. A raw material stocking data unit 103 is built-in the setting module 102. The raw material stocking data unit 103 stores detail data of each housing 311, motherboard 321, element 331. Each menu in the menu module 3 may be read from the raw material stocking data unit 103. According to the set of the receiving/transmitting module 101, the user may store a newest information in the raw material stocking data unit 103 to increase the types of selections in the main virtual frame 1. Finally, please reference to FIGS. 1 and 7, in order to increase the fun of operation in the main virtual frame 1, the main virtual frame 1 further includes a linking module 104. The linking module 104 may be wirelessly connected to other virtual device 10 so that many groups of users may operate, communicate, and even compete for assembly performance in same main virtual frame 1. Besides it may increase the fun, it may also obtain relative knowledge.

In conclusion, the user may wear the virtual device 10 to virtually electrically couple and assemble the housings 311, the motherboards 321, and the elements in the heat dissipation assembly menu 33 in the main virtual frame 1 and check and test the performance in the main virtual frame 1. It may more freely develop to achieve the best performance. It may also prevent from errors to result in being unable to repair and bad performance. And the user may use less time to know if the assembled finish good is good. It may save time and physical strength.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A virtual reality operation platform structure built-in a virtual reality device, the structure comprising:
    a main virtual frame;
    a virtual reality operation processing module, built-in the main virtual frame;
    a menu module, built-in the main virtual frame, the menu module having a housing menu, a motherboard menu, and a heat dissipation assembly menu, the housing menu including a plurality of housings, the motherboard menu including a plurality of motherboards, the heat dissipation assembly menu including a plurality of elements, the elements virtually electrically coupled to the motherboards, the motherboards and the housings being assembled with each other via the virtual reality operation processing module;
    an output checking module, built-in the main virtual frame and connected with the menu module and configured to check an output performance of the motherboards while being coupled to the elements and further to generate a performance form;
    a clearing module, built-in the main virtual frame and connected to the menu module, the clearing module configured to clear the selections of the housings, the motherboards, and the elements to re-select with the menu module; and
    an accounting module, built-in the main virtual frame and connected to the menu module, the accounting module generating a list according to the selected housings, the motherboards, and the elements; and
    wherein a user operates the virtual reality operation processing module to virtually operate the assembly, and to virtually connect the housings, the motherboards, and the elements, and further to check performances in the main virtual frame, and the user purchases real housings, real motherboards, and real elements according to the list; if the performances of the selected housings, the selected motherboards, and the selected elements are not what the user wants, the clearing module clears the selection of the housings, the motherboards, and the elements.

2. The virtual reality operation platform structure as claimed in claim 1, further comprising a debug module which is built-in the main virtual frame, the debug module debugs the assembly, position, and connection of the housings, the motherboards, and the elements.

3. The virtual reality operation platform structure as claimed in claim 2, wherein a suggesting form is output after the debug module is finished debugging, and the suggested form provides a list of at least one collocation of the suitable housings, the suitable motherboards, and the suitable elements according to a debug result of the debug module.

4. The virtual reality operation platform structure as claimed in claim 1, further comprising a customizing module which is built-in the main virtual frame, and the customizing module being configured to modify a size of each element listed in the heat dissipation module.

5. The virtual reality operation platform structure as claimed in claim 4, further comprising a setting module which is built-in the virtual frame, a raw material stocking data unit being built-in the setting module, the raw material stocking data unit saving data of each housing, each motherboard, and each element, each menu of the menu module reading the data of each housing, each motherboard, and each element from the raw material stocking data unit to select and view.

6. The virtual reality operation platform structure as claimed in claim 5, wherein the setting module includes a receiving/transmitting module which is wirelessly or wired electrically connected to a mobile device, the mobile device is a computer, a cell phone, or a tablet, and transmits new data of each hosing, each motherboard, and each element to the receiving/transmitting module so as to be stored in the raw material stocking data unit, the mobile device outputs the list of the housings, the motherboards, and the elements after being assembled and connected to each other.

7. The virtual reality operation platform structure as claimed in claim 6, further comprising a linking module which is built-in the main virtual frame, and the linking module is wirelessly connected to other virtual device, and are displayed in the same main virtual frame.

8. The virtual reality operation platform structure as claimed in claim 5, wherein the setting module includes a receiving/transmitting module which is wirelessly connected to a store and transmits the list, the store collects the housings, the motherboards, and the elements according to the list.

9. The virtual reality operation platform structure as claimed in claim 8, further comprising a linking module which is built-in the main virtual frame, and the linking module is wirelessly connected to other virtual device, and are displayed in the same main virtual frame.

10. The virtual reality operation platform structure as claimed in claim 1, further comprising a tour module which is built-in the main virtual frame, and the tour module is displayed by audio, video, text, and figure.

* * * * *